United States Patent
Manka

(10) Patent No.: US 11,787,969 B2
(45) Date of Patent: Oct. 17, 2023

(54) NON-SKID, TEXTURED PROTECTIVE COATING COMPOSITIONS FOR VEHICLE SURFACES

(71) Applicant: THE SHERWIN WILLIAMS COMPANY, Cleveland, OH (US)

(72) Inventor: Julie Manka, Cleveland, OH (US)

(73) Assignee: The Sherwin-Williams Company, Cleveland, OH (US)

( * ) Notice: Subject to any disclaimer, the term of this patent is extended or adjusted under 35 U.S.C. 154(b) by 168 days.

(21) Appl. No.: 17/168,994

(22) Filed: Feb. 5, 2021

(65) Prior Publication Data

US 2021/0155822 A1    May 27, 2021

Related U.S. Application Data

(63) Continuation of application No. 15/292,407, filed on Oct. 13, 2016, now Pat. No. 10,941,310.

(51) Int. Cl.
| | | |
|---|---|---|
| *C09D 133/10* | (2006.01) | |
| *C09D 5/00* | (2006.01) | |
| *C09D 7/43* | (2018.01) | |
| *C09D 7/65* | (2018.01) | |
| *C08K 5/12* | (2006.01) | |
| *C08K 3/34* | (2006.01) | |
| *C08K 5/21* | (2006.01) | |

(52) U.S. Cl.
CPC ............. *C09D 133/10* (2013.01); *C09D 5/00* (2013.01); *C09D 7/43* (2018.01); *C09D 7/65* (2018.01); *C08K 3/34* (2013.01); *C08K 5/12* (2013.01); *C08K 5/21* (2013.01)

(58) Field of Classification Search
CPC .......... C09D 133/10; C09D 5/00; C09D 7/43; C09D 7/65
USPC ........................................................ 524/216
See application file for complete search history.

(56) References Cited

U.S. PATENT DOCUMENTS

| | | | |
|---|---|---|---|
| 3,372,880 A | 3/1968 | O'Hara | |
| 4,071,645 A * | 1/1978 | Kahn | C09G 1/16 106/6 |
| 4,591,533 A | 5/1986 | Antonelli | |
| 5,759,630 A | 6/1998 | Vosskuhl | |
| 5,863,646 A * | 1/1999 | Verardi | C09D 123/28 428/323 |
| 6,593,423 B1 | 7/2003 | Kondos | |
| 2002/0151629 A1 | 10/2002 | Bufkin | |
| 2003/0018118 A1 | 1/2003 | Burnett | |
| 2007/0240617 A1 | 10/2007 | Simpson | |
| 2008/0103237 A1 | 5/2008 | Strepka | |
| 2008/0108731 A1* | 5/2008 | Sandor | C09D 7/70 524/439 |
| 2009/0271933 A1* | 11/2009 | Shah | C09D 5/008 8/561 |
| 2010/0041772 A1 | 2/2010 | Liversage | |
| 2011/0076244 A1 | 3/2011 | Hammer | |
| 2013/0143982 A1 | 6/2013 | Jin | |
| 2014/0079657 A1 | 3/2014 | Resnick | |

OTHER PUBLICATIONS

Additives for Texture Surfaces from Micro Powders, Inc. No Date.*
Technical Data Sheet for Dowsil 62 Additive and Dowsil 65 Additive. No Date.*
http://oasys2.confex.com/acs/228nm/techprogram/S15709.HTM. Conference for New Developments in Coatings Technology, Published on Aug. 26, 2004.
http://oasys2.confex.com/acs/228nm/techprogram/P767489.HTM. Presentation for Modified urea based liquid rheology additives for coatings. Published on Aug. 26, 2004.
Technical Data Sheet for Dowsil 62 Additive. No date.
Texturing Additives for Inks and Coatings. No Date. Shamrock.
The Manufacture and Properties of PTFE Micropowders, No Date. Shamrock.
Richard J. Lewis, Sr., Hawley's Condensed Chemical Dictionary, Published in 1997, Van Nostrand Reinhold, 13th Edition, p. 318.
Technical Data Sheet for Dowsil 65 Additive. No date.

* cited by examiner

*Primary Examiner* — Deve V Hall
(74) *Attorney, Agent, or Firm* — Tucker Ellis LLP

(57) ABSTRACT

In general, the embodiments herein provide non-skid, textured protective coating compositions for vehicle surfaces, such as vehicle beds, rocker panels, inner fenders, tailgates, bedrails, cargo vans, step area, and running boards, and other applicable metal, aluminum, fiberglass, plastic, and wood surfaces, and the method for producing same. In particular, embodiments of the present disclosure relate to textured protective coating compositions having improved impact, abrasion, and chemical resistance. These properties are obtained by a combination of an acrylic resin component and a solvent composition, and optionally a rheology additive component, a texturizing component, an adhesion promoter, and a plasticizer.

18 Claims, No Drawings

NON-SKID, TEXTURED PROTECTIVE COATING COMPOSITIONS FOR VEHICLE SURFACES

CROSS REFERENCE TO RELATED APPLICATION

This application claims priority to U.S. Provisional Patent Application 62/313,473 filed on Mar. 25, 2016, the entirety of which is incorporated herein by reference. Further, this application claims priority to U.S. patent application Ser. No. 15/292,407 filed on Oct. 13, 2016, the entirety of which is incorporated herein by reference.

BACKGROUND

Embodiments of the subject matter disclosed herein relate to non-skid, textured protective coatings for vehicle surfaces, such as vehicle beds, rocker panels, and other applicable metal, aluminum, fiberglass, plastic, and wood surfaces, and the method for producing same. In particular, embodiments of the present disclosure relate to textured protective coating compositions having improved impact, abrasion, and chemical resistance. These properties are obtained by a combination of an acrylic resin component and a solvent composition, and optionally a rheology additive component, a texturizing component, an adhesion promoter, and a plasticizer. The coating is applied to the surface using variety of techniques, include a roller, spray gun, aerosol spray can, and other conventional application methods. While reference is made herein to coating compositions for vehicle beds and rocker panels, it should be understood that this disclosure is directed to coating compositions for other surfaces of a vehicle, such as, but not limited to, inner fenders, tailgates, bedrails, cargo vans, step area, and running boards, as well as other applicable metal, aluminum, fiberglass, plastic, and wood surfaces.

Protective coating compositions have been widely used to protect the outer surfaces of vehicles to minimize or prevent damage done to such surfaces, such as damage which may be caused from debris from the road surface, foul weather, contact with corrosive substances, typical wear and tear, and the like. As an example, vehicle bed coating compositions have achieved widespread acceptance in place of traditional, preformed plastic bedliners. However, currently, such vehicle bed coating compositions are only available in black. Customers of such vehicle bed coating compositions often desire to have such coatings be clear or in a color that coordinates with the color of the vehicle to which the coating is to be applied. In addition, customers desire that the coating compositions have impact and abrasion resistance with respect to the normal wear and tear associated with such vehicle beds as well as chemical resistance to those materials with which such vehicle beds are typically in contact.

As another example, rocker panel coating compositions have been used to coat the rocker panels on vehicles to minimize the damage caused by rocks and other debris thrown up from the wheels of the vehicle. Such compositions must also have impact and abrasion resistance as well as chemical resistance to any materials encountered by the rocker panels during operation of the vehicle.

In addition to protecting the vehicle surfaces, the coating compositions need to have low VOC (volatile organic compound) emissions. Regulatory requirements minimizing the use of VOC containing coatings are becoming increasingly more stringent.

It may be desirable to have an improved coating composition for vehicle surfaces as well as other metal, aluminum, fiberglass, plastic, and wood surfaces.

SUMMARY

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with the present disclosure, there is provided a non-skid, textured protective coating for vehicle surfaces, such as vehicle beds, rocker panels, and other metal, aluminum, fiberglass, plastic, and wood surfaces, and the method for producing same. In one embodiment herein, the coating composition is clear in color. In another embodiment herein, the coating composition includes at least some colorant or pigmentation.

In accordance with the present disclosure, the coating composition is comprised of an acrylic resin component and a solvent composition. In a preferred embodiment, the coating composition includes a rheology additive component and a texturizing component. Other components may also be included depending on the application or additional desired performance properties. The resulting coating composition is resistant to abrasion and chipping, and has chemical resistance to materials with which vehicle surfaces are typically in contact. The resulting coating composition also has good adhesion properties to the surfaces to which is to be applied.

The coating composition is applied to a surface using a variety of techniques, including a roller, spray gun, aerosol spray can, and other conventional application methods.

Still other advantages, aspects and features of the subject disclosure will become readily apparent to those skilled in the art from the following description wherein there is shown and described a preferred embodiment of the present disclosure, simply by way of illustration of one of the best modes best suited to carry out the subject disclosure As it will be realized, the present disclosure is capable of other different embodiments and its several details are capable of modifications in various obvious aspects all without departing from the scope herein. Accordingly, the description will be regarded as illustrative in nature and not as restrictive.

DETAILED DESCRIPTION

This description provides examples not intended to limit the scope of the appended claims. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In general, the embodiments herein provide non-skid, textured protective coating compositions for vehicle surfaces, such as vehicle beds, rocker panels, and other applicable metal, aluminum, fiberglass, plastic, and wood surfaces, and the method for producing same. While reference is made herein to coating compositions for vehicle beds and rocker panels, it should be understood that this disclosure is directed to coating compositions for other surfaces of a vehicle, such as, but not limited to, inner fenders, tailgates, bedrails, cargo vans, step area, and running boards, as well as other applicable metal, aluminum, fiberglass, plastic, and wood surfaces.

According to one embodiment of the present disclosure, there is provided a coating composition comprising an acrylic resin component and a solvent composition. In a preferred embodiment, the coating composition further comprises a rheology additive component and a texturizing component to induce texture and improve performance properties thereof. The coating composition may further include other components depending on the application surface or additional desired performance properties, such as colorant or pigmentation components, plasticizers, adhesion promoters, defoamers, and the like.

The acrylic resin component is preferably a thermoplastic polymer resin. In a preferred embodiment, the acrylic resin is methacrylate resin, either as a homopolymer, copolymer, or terpolymer. The acrylic resin ideally comprises a methacrylate copolymer. This may be produced from the polymerization of one or more methacrylate and acrylate monomers, such as any of the following: methyl methacrylate, ethyl methacrylate, n-butyl methacrylate, isobutyl methacrylate, t-butyl methacrylate, 2-hydroxy ethyl methacrylate, 2-hydroxy propyl methacrylate, 2-ethylhexyl methacrylate, and the corresponding acrylates. The preferred acrylic resin is a low molecular weight methacrylate copolymer. In a more preferred embodiment, the acrylic resin is a low molecular weight methacrylate copolymer that is soluble in VOC exempt solvents. Suitable methacrylate copolymers include, but are not limited to, Elvacite® 2028 available from Lucite International, Inc. and Paraloid B48-N available from Rohm and Haas.

The acrylic resin component comprises from about 15% to about 40% by weight of the coating composition, depending on the application surface, desired performance properties, and method of application. In one embodiment, in which the coating composition is to be applied to the surface in bulk using a roller or other conventional application tool, the acrylic resin component may comprise from about 30% to about 40% by weight of the coating composition. In another embodiment, in which the coating composition is to be applied as an aerosol, the acrylic resin component may comprise about 15% to 40% by weight of the coating composition.

The acrylic resin component is incorporated into a suitable solvent composition. The solvent composition preferably allows for optimal clarity, gloss, application, and dry time properties for the acrylic resin component used in connection therewith. Further, in a preferred embodiment, the solvent composition, when combined the acrylic resin component to form the coating composition should have low VOC emissions and be in compliance therefore for all 50 of the United States.

In a preferred embodiment, the solvent composition used with a selected acrylic resin component, should have the desired clarity or coloration, glossiness, ease of application, and time required to dry after application to the desired surface. The solvent composition may include alcohols, ketones, propylene and ethylene glycol ethers and acetates, aliphatic and aromatic hydrocarbons, and naphthas. In a preferred embodiment, the solvent composition is comprised of at least one of acetone, parachlorobenzotrifluoride (PCBTF), toluene, naphthalene, xylene, methyl acetate, methyl ethyl ketone, and the like. In a more preferred embodiment, the solvent composition is comprised of at least one of acetone, PCBTF, and toluene. The solvent composition comprises from about 60% to about 85% by weight of the coating composition.

The coating composition may further include a rheology additive to improve thixotropic flow behavior in the coating composition. In a preferred embodiment, the rheology additive should have the desired clarity or coloration, glossiness, solvent activation properties, and other performance properties for the intended use and application of the coating composition. The rheology additive may include mixed mineral additives, modified urea additives, powder additives, and the like as are known in the art. In a preferred embodiment, the rheology additive is comprised of modified urea in combination with nepheline syenite. Suitable rheology additives include, but are not limited to, Garamite 1958 available from BYK, Garamite 2578 available from BYK, BYK 411 available from BYK, BYK 410 available from BYK, Minex 4 available from Unimin Corporation, and Tixogel available from BYK. The rheology additive comprises up to about 5% by weight of the coating composition. In a preferred embodiment, the rheology additive comprises up to about 2.5% by weight of the coating composition.

The coating composition may also include a texturizing component to induce texture therein and provide non-slip properties. In a preferred embodiment, the texturizing component used should not negatively impact clarity or gloss of the coating composition, and therefore, the refractive index of the coating composition and the texturizing component should be match or close. The texturizing component may include glass beads, glass bubbles, ceramic beads, plastic beads, and wax beads.

In a preferred embodiment for clear coating compositions, the texturizing component is comprised of plastic beads, wax beads, or combinations thereof. In a more preferred embodiment, the texturizing component is comprised of wax beads, including, but not limited to, micronized polypropylene beads, micronized polyamide beads, and the like. Suitable texturizing components include, but are not limited to, Propyltex (micronized polypropylenes) available from Micro Powders, Inc., and Nylotex (finely micronized polyamides) available from Micro Powders, Inc.

In one embodiment, wherein the coating composition is to be applied to vehicle beds and similar surfaces, the texturizing component is comprised of micronized polyamide beads having a particle size of 50.

In another embodiment, wherein the coating composition is to be applied to rocker panels and similar surfaces, the texturizing component is comprised of micronized polypropylene beads having a particle size of between 50 to 80, and more preferably having a particle size of 50.

The texturizing component comprises from about 1% to about 7% by weight of the coating composition. The amount of texturizing component present in the coating composition depends on the use and method of application, wherein a coating composition applied as an aerosol may require less texturizing component. In one embodiment, wherein the coating composition is to be applied to rocker panels and similar surfaces, the texturizing component comprises from about 1.5% to about 3% by weight of the composition. In one embodiment, wherein the coating composition is to be applied as an aerosol, the texturizing component comprises about 1.5% by weight of the composition.

The coating composition may also contain an adhesion promoter to increase the adhesion between the coating composition and the surface to which it is to be applied as is known in the art. In a preferred embodiment, the coating composition includes an adhesion promoter to increase the adhesion of the coating to plastic materials. The adhesion promoter is particularly useful for coating compositions which are to be applied to rocker panels and similar surfaces. The adhesion promoter is preferably a chlorinated polyolefin. Suitable adhesion promoters, include, but are not limited to, those offered by Eastman Chemical Company, such as CRO 515-2 and CRO 730-1. In a preferred embodiment, the coating composition is comprised of up to about 5% by weight of adhesion promoter, and more preferably, up to about 2.5% by weight of adhesion promoter.

The coating composition may further contain a suitable plasticizer to increase flexibility of the composition as is known in the art. The plasticizer is particularly useful for coating compositions which are to be applied to rocker panels and similar surfaces. In a preferred embodiment, the plasticizer is dibenzoate plasticizer having a low VOC. Suitable plasticizers include, but are not limited to, KFLEX plasticizers offered by Emerald Performance Materials-Kalama Chemical. In a preferred embodiment, the coating composition is comprised of up to about 2% by weight of plasticizer. In a more preferred embodiment, the coating composition is comprised of about 0.5% by weight of plasticizer.

The coating composition may further include a defoaming agent as is required depending on the desired use and performance properties. The defoaming agent may include polymer-based defoamers, silicone-based defoamers, and the like. Suitable defoaming agents include, but are not limited to, those offered by BYK, such as BYK 052 N. In a preferred embodiment, the coating composition is comprised of about 1% to about 5% by weight of defoaming agent. In a more preferred embodiment, the coating composition is comprised of about 2% by weight of the defoaming agent.

The coating composition may further include UV-light stabilization component to protect the coating composition from ultraviolet radiation. Suitable UV-light stabilization components include, but are not limited to, those offered by Chitec Technology Co., such as Chiguard 353. In a preferred embodiment, the coating composition is comprised of up to about 3% by weight of a UV-light stabilization component.

The coating composition may also include a corrosion inhibitor to improve corrosion resistance and/or water resistance. Suitable corrosion inhibitors include, but are not limited to, those offered by King Industries Specialty Chemicals, such as Nacorr 1651.

The coating composition may contain one or more pigments to introduce color to the composition. Conventional pigments that can be used in the coating composition may include metallic oxides such as titanium dioxide, zinc oxide, iron oxides of various colors, carbon black, filler pigments such as talc, china clay, barytes, carbonates, silicates, and a wide variety of organic colored pigments such as quinacridones, copper phthalocyanines, perylenes, azo pigments, indanthrone blues, carbazoles such as carbazole violet, isoindolinones, isoindolones, thioindigo reds, benzimidazolinones, and the like.

In one embodiment, the coating composition is for application to vehicle beds and similar types of surfaces and comprises an acrylic resin, a solvent, a rheology additive, and a texturizing component. In one embodiment, the coating composition is applied to vehicle beds in bulk using a roller or other conventional application tool. In a preferred embodiment, such coating composition comprises from about 30% to about 40% by weight of acrylic resin, from about 60% to about 70% by weight of solvent, up to about 5% by weight of rheology additive, and from about 1% to about 7% by weight of texturizing component. In a more preferred embodiment, such coating composition includes from about 1% to about 5% by weight of a defoaming agent and up to about 3% of a UV-light stabilization component. The coating composition may also include a corrosion inhibitor and one or more pigments.

In another embodiment, the coating composition is applied to vehicle beds in aerosol form. In a preferred embodiment, such coating composition comprises from about 15% to about 40% by weight of acrylic resin, from about 60% to about 85% by weight of solvent, up to about 5% by weight of rheology additive, and from about 1.5% to about 3% by weight of texturizing component. In a more preferred embodiment, such coating composition includes from about 1% to about 5% by weight of a defoaming agent and up to about 3% of a UV-light stabilization component. The coating composition may also include a corrosion inhibitor and one or more pigments.

In one embodiment, the coating composition is for application to rocker panels and similar surfaces, and comprises an acrylic resin, a solvent, a rheology additive, an adhesion promoter, and a plasticizer. In one embodiment, the coating composition is applied to rocker panels in bulk using a roller or other conventional application tool. In a preferred embodiment, such coating composition comprises from about 30% to about 40% by weight of acrylic resin, from about 60% to about 70% by weight of solvent, up to about 5% by weight of rheology additive, up to about 5% by weight of adhesion promoter, and up to about 2% by weight of plasticizer. In a preferred embodiment, such coating composition includes from about 1% to about 7% by weight of a texturizing component, from about 1% to about 5% by weight of a defoaming agent, and up to about 3% of a UV-light stabilization component. The coating composition may also include a corrosion inhibitor and one or more pigments.

In one embodiment, the coating composition is applied to rocker panels in aerosol form. In a preferred embodiment, such coating composition comprises from about 15% to about 40% by weight of acrylic resin, from about 60% to about 85% by weight of solvent, up to about 5% by weight of rheology additive, up to about 5% by weight of adhesion promoter, and up to about 2% by weight of plasticizer. In a preferred embodiment, such coating composition includes from about 1% to about 5% by weight of a defoaming agent and up to about 3% of a UV-light stabilization component. The coating composition may also include a corrosion inhibitor and one or more pigments. In a preferred embodiment, wherein the coating composition is to be applied to rocker panels in aerosol form and is clear form, the coating composition includes from about 1.5% to about 3% by weight of texturizing component.

To prepare the coating composition, the acrylic resin component is dissolved in the solvent composition to form a substantially homogenous coating blend. Other components, such as a rheology additive, texturizing component, plasticizer, defoamer, UV-light stabilization component, pigments, and the like, are added accordingly and mixed therein to as part of the coating composition.

The coating composition of the present disclosure is designed to be applied to a surface using a variety of techniques, including a roller, spray gun, aerosol spray can, and other conventional application methods. Preparation of the surface to be coated with the composition may include cleaning of the surface, and may involve chemical cleaning, or any other cleaning known in the art. Chemical cleaning may involve the use of one or more types of cleaning agents such as solvent cleaners, water-based cleaners, water based emulsion cleaners, alkaline cleaners, and acidic cleaners.

The following examples further illustrate details of the preparation and use of the compositions of the present disclosure. The disclosure is not intended to be limited by these specific examples, however. All parts and percentages are by weight.

EXAMPLES

Exemplary non-skid, textured protective coating compositions were made by mixing the following components using techniques known to those of ordinary skill in the art:

Comparative Example A

| Component | Weight % |
|---|---|
| Acetone | 35.6412 |
| PCBTF[1] | 15.5907 |
| Napthalene[2] | 10.1223 |
| Acrylic copolymer resin[3] | 7.096 |
| Acrylic copolymer resin[4] | 5.8985 |
| Acrylic copolymer resin[5] | 5.8985 |
| Rheology modifier[6] | 13.8542 |

[1]Oxsul ® 100 from Isle Chem Inc.
[2]Naptha 100 from the Sherwin-Williams Company
[3]Pliolite AC80 from OMNOVA Solutions, Inc.
[4]Pliolite AC4 from OMNOVA Solutions, Inc.
[5]Pliolite AC5G from OMNOVA Solutions, Inc.
[6]Imsil ® A-10 from Unimen Corporation

Example 1

| Component | Weight % |
|---|---|
| Acetone | 18.02385 |
| PCBTF[1] | 50.30865 |
| Defoaming agent[2] | 0.9224 |
| Acrylic copolymer resin[3] | 30.4683 |
| Corrosion inhibitor[4] | 0.2762 |

[1]Oxsul ® 100 from Isle Chem Inc.
[2]BYK 052N from from Byk
[3]Elvacite ® 2028 from Lucite International
[4]Nacorr 1651 from King Industries

Example 2

| Component | Weight % |
|---|---|
| Acetone | 13.2748 |
| PCBTF[1] | 43.8799 |
| Toluene | 6.5303 |
| Acrylic copolymer resin[2] | 31.6604 |
| Corrosion inhibitor[4] | 0.2762 |
| Rheology modifier[5] | 1.1536 |

[1]Oxsul ® 100 from Isle Chem Inc.
[2]Elvacite ® from Lucite International
[3]Nacorr 1651 from King Industries
[4]Garamite ® 1958 from Byk The coating compositions of Comparative Example A and Examples 1 and 2 were subjected the performance testing as shown below in Table 1.

TABLE 1

| Performance Testing | Comparative Example A | Example 1 | Example 2 |
|---|---|---|---|
| VOC | 309.11 | 202.76 | 199.69 |
| Chemical Resistance | | | |
| Gasoline | 0 - coating dissolved | 2 - watchglass ring | 2 - watchglass ring |
| Brake Fluid | 5 - no impact | 3 - coating deglossing | 3 - coating deglossing |
| Grease | 5 - no impact | 5 - no impact | 5 - no impact |
| Motor Oil | 5 - no impact | 5 - no impact | 5 - no impact |
| Transmission Fluid | 4 - slight deglossing | 5 - no impact | 5 - no impact |
| Antifreeze | 5 - no impact | 5 - no impact | 5 - no impact |
| Impact Resistance | 4 - chips at 80 | 5 - no chipping at maximum | 5 - no chipping at maximum |
| Adhesion (steel) | 0 - total removal | 5 - complete adhesion | 5 - complete adhesion |
| 200 Hour QUV | Severe yellowing | Moderate yellowing | Moderate yellowing |

The coating composition of Example 1 was compared to commercially available coating compositions as shown in Table 2. The coating composition of Example 1 showed superior adhesion resistance and flexibility. The coating composition of Example 1 also showed improved impact and abrasion resistance as well as chemical resistance to selected materials in which such coating compositions are typically in contact during use.

TABLE 2

| Performance Testing | Control Dupli-Color Truck Bed Liner (solvent-borne black)[1] | | Example 1 (Dupli-Color Clear)[2] | | Plasti-Kote Truck Bed Liner[3] | | Herculiner Truck Bed[4] | | Rust-oleum Truck Bed Liner[5] | | Dupli-Color Bed Armor[6] | | Dupli-Color Bed Armour (water-borne black)[7] | |
|---|---|---|---|---|---|---|---|---|---|---|---|---|---|---|
| Tape Pull Adhesion (5 is best) | | | | | | | | | | | | | | |
| Steel | 0.00 | | 5.00 | | 3.33 | | 4.67 | | 0.33 | | 4.00 | | 4.67 | |
| Aluminum | 0.00 | | 4.67 | | 0.67 | | 5.00 | | 2.33 | | 4.67 | | 4.67 | |
| OE | 0.00 | | 1.33 | | 0.00 | | 1.00 | | 0.00 | | 0.00 | | 1.33 | |
| Chemical Resistance (5 is best) | 1 hr | 24 hr | 1 hr | 24 hr | 1 hr | 24 hr | 1 hr | 24 hr | 1 hr | 24 hr | 1 hr | 24 hr | 1 hr | 24 hr |
| MEK | 4 | 4 | 5 | 5 | 5 | 5 | 5 | 5 | 4 | 3 | 5 | 4 | 3 | 2 |
| Acetone | 3 | 3 | 3 | 4 | 5 | 4 | 5 | 5 | 0 | 0 | 5 | 5 | 3 | 2 |
| Xylene | 1 | 0 | 1 | 3 | 2 | 2 | 5 | 5 | 0 | 0 | 4 | 5 | 0 | 0 |
| Toluene | 1 | 0 | 1 | 3 | 5 | 5 | 5 | 5 | 0 | 0 | 3 | 3 | 0 | 0 |

TABLE 2-continued

| Performance Testing | Control Dupli-Color Truck Bed Liner (solvent-borne black)[1] | | Example 1 (Dupli-Color Clear)[2] | | Plasti-Kote Truck Bed Liner[3] | | Herculiner Truck Bed[4] | | Rust-oleum Truck Bed Liner[5] | | Dupli-Color Bed Armor[6] | | Dupli-Color Bed Armour (water-borne black)[7] | |
|---|---|---|---|---|---|---|---|---|---|---|---|---|---|---|
| Gasoline | 2 | 2 | 4 | 4 | 5 | 5 | 5 | 5 | 1 | 1 | 5 | 5 | 3 | 4 |
| Transmission Fluid | 5 | 5 | 5 | 5 | 5 | 5 | 5 | 5 | 5 | 5 | 5 | 5 | 5 | 5 |
| Motor Oil | 5 | 5 | 5 | 5 | 5 | 5 | 5 | 5 | 4 | 5 | 4 | 4 | 5 | 5 |
| Brake Fluid | 4 | 4 | 4 | 4 | 4 | 4 | 5 | 5 | 4 | 4 | 5 | 5 | 3 | 4 |
| Anti-freeze | 4 | 5 | 5 | 5 | 5 | 4 | 5 | 5 | 5 | 5 | 5 | 5 | 5 | 5 |
| Flexibility (higher is better) | 28.00 | | 28.00 | | 18.67 | | 28.00 | | 28.00 | | 23.33 | | 28.00 | |
| Impact (higher is better) | 40 | | 100 | | 40 | | 120 | | 60 | | 80 | | 40 | |
| Taber Abrasion (0 is best) | | | | | | | | | | | | | | |
| 1 hr | 102.7 | | 76.1 | | 101.3 | | 1.9 | | 1404.6 | | 108.9 | | 129.1 | |
| 24 hr | 185.7 | | 144.5 | | 141.0 | | 4.9 | | 1451.9 | | 185.4 | | 362.1 | |
| Coefficient of Friction (≥0.5 is slip resistant) | 0.55 ± 0.09 | | 0.49 ± 0.04 | | 0.74 ± 0.05 | | 0.81 ± 0.09 | | 0.40 ± 0.04 | | 0.78 ± 0.04 | | NA | |
| Corrosion Resistance | | | | | | | | | | | | | | |
| Surface Rust/Stain (lower is better) | 40% | | 2% | | 80% | | 2% | | 5% | | 95% | | NA | |
| Blister Frequency (higher is better) | 4 | | 8 | | 2 | | 10 | | 4 | | 10 | | NA | |
| Blister Size (higher is better) | 0 | | 3 | | 2 | | 10 | | 2 | | 10 | | NA | |
| Degree Rust on Surface (lower is better) | 15% | | 3% | | 65% | | 0% | | 1% | | 95% | | NA | |
| Rust Creep (lower is better) | 3.13 mm | | 1.25 mm | | 100 | | 0.6 mm | | 0.56 mm | | 100 | | NA | |
| Rust Under Coating (lower is better) | 90% | | 1% | | 98% | | 55% | | 8% | | 98% | | NA | |

[1]Dupli-Color ® Truck Bed Liner (solvent-borne black) from Dupli-Color Products
[2]Dupli-Color ® Clear from Dupli-Color Products
[3]PlastiKote ® Truck Bed Liner from Valspar Corporation
[4]Herculiner ® Truck Bed from Old World Industries, LLC
[5]Rust-Oleum Truck Bed Liner from Rust-Oleum
[6]Dupli-Color ® Bed Armor ® from Dupli-Color Products
[7]Dupli-Color ® Bed Armor ® (waterborne black) from Dupli-Color Products The coating compositions as described herein have improved impact and abrasion resistance as well as chemical resistance to selected materials in which such coating compositions are typically in contact. In addition, the coating compositions are easily prepared and subsequently applied to the desired surface and have low VOC with 50 state compliance.

Having thus described certain embodiments for practicing aspects of the present disclosure, it is to be appreciated that various alterations, modifications, and improvements will readily occur to those skilled in the art. Such alterations, modifications, and improvements are intended to be part of this disclosure, and are intended to be within the spirit and scope of this disclosure.

What is claimed is:

1. A non-skid, textured protective coating composition for vehicle surfaces, comprising:
    an acrylic resin from about 15% to about 40% by weight of the coating composition;
    a solvent composition from about 60% to about 85% by weight of the coating composition;
    a rheology additive component from about 1% to about 5% by weight of the coating composition, and the rheology additive component comprising modified urea and nepheline syenite to improve thixotropic flow behavior of the coating composition during application on the vehicle surface by providing for improved flow during application of the coating and an improved viscous state after application; and
    a texturizing component from about 1% to about 7% by weight of the coating composition.

2. The protective coating composition of claim 1, wherein the acrylic resin is a methacrylate copolymer resin that is clear after application.

3. The protective coating composition of claim 2, wherein the methacrylate copolymer resin is soluble in VOC exempt solvents.

4. The protective coating composition of claim 1, wherein the composition is configured to be applied to the vehicle surface using a non-spray, bulk applicator the composition comprises from about 30% to about 40% by weight of the acrylic resin.

5. The protective coating composition of claim 1, wherein the composition is configured to be applied to the vehicle surface using a spray applicator the composition comprises from about 15% to about 30% by weight of the acrylic resin.

6. The protective coating composition of claim 1, wherein the solvent composition comprises at least one of acetone, parachlorobenzotrifluoride (PCBTF), toluene, naphthalene, xylene, methyl acetate, methyl ethyl ketone, and combinations thereof.

7. The protective coating composition of claim 6, wherein the solvent composition comprises at least one of acetone, PCBTF, toluene, and combinations thereof.

8. The protective coating composition of claim 1, wherein the texturizing component comprises at least one of plastic beads, wax beads, and combinations thereof.

9. The protective coating composition of claim 8, wherein the texturizing component comprises wax beads selected from the group consisting of micronized polypropylene beads, micronized polyamide beads, and combinations thereof, and wherein the texturizing component has a bead size of about 50 or higher, and is results in a textured property for the outer surface of the coating composition after application to the vehicle surface.

10. The protective coating composition of claim 1, wherein the coating composition is further comprised of adhesion promoter from greater than zero percent to about 5% by weight of the coating composition to increase an adhesion between the coating composition and a vehicle surface.

11. The protective coating composition of claim 1, wherein the adhesion promoter comprises chlorinated polyolefin.

12. The protective coating composition of claim 1, wherein the coating composition comprises a plasticizer from greater than zero to up to about 2% by weight of the coating composition.

13. The protective coating composition of claim 12, wherein the plasticizer comprises dibenzoate plasticizer.

14. The protective coating composition of claim 1, wherein the coating composition further comprises a defoaming agent from about 1% to about 5% by weight of the coating composition, wherein the defoaming agent is selected from the group consisting of polymer-based defoaming agents, silicone-based defoaming agents, and combinations thereof.

15. The protective coating composition of claim 1, wherein the coating composition further comprises at least one of a UV-light stabilization component and a corrosion inhibitor.

16. The protective coating composition of claim 1, wherein the coating composition further comprises at least one pigment.

17. A protective coating composition, comprising:
an acrylic resin from about 15% to about 40% by weight of the coating composition;
a solvent composition from about 60% to about 85% by weight of the coating composition;
a rheology additive component from about 1% to about 5% by weight of the coating composition, and the rheology additive component comprising modified urea and nepheline syenite to improve thixotropic flow behavior of the coating composition during application on the vehicle surface by providing for improved flow during application of the coating and an improved viscous state after application;
a texturizing component from about 1% to about 7% by weight of the coating composition;
an adhesion promoter from greater than zero percent up to about 5% by weight of the coating composition; and
a plasticizer from greater than zero percent up to about 2% by weight of the coating composition.

18. A protective coating composition, comprising:
an methacrylate copolymer resin from about 15% to about 40% by weight of the coating composition;
a solvent composition from about 60% to about 85% by weight of the coating composition, wherein the solvent composition comprises at least one of acetone, PCBTF, toluene, and combinations thereof;
a rheology additive component from about 1% to about 5% by weight of the coating composition, wherein the rheology additive component improves thixotropic flow behavior of the coating composition during application on the vehicle surface by providing for improved flow during application of the coating and an improved viscous state after application, and wherein the rheology additive component comprises modified urea and nepheline syenite;
a texturizing component from about 1% to about 7% by weight of the coating composition, wherein the texturizing component comprises wax beads selected from the group consisting of micronized polypropylene beads, micronized polyamide beads, and combinations thereof, and wherein the texturizing component has a bead size of about 50 or higher, and is results in a textured property for the outer surface of the coating composition after application to the vehicle surface;
an adhesion promoter from greater than zero percent up to about 5% by weight of the coating composition; and
a plasticizer from greater than zero percent up to about 2% by weight of the coating composition; and
at least one pigment.

* * * * *

UNITED STATES PATENT AND TRADEMARK OFFICE
CERTIFICATE OF CORRECTION

PATENT NO. : 11,787,969 B2
APPLICATION NO. : 17/168994
DATED : October 17, 2023
INVENTOR(S) : Julie Manka Page 1 of 1

It is certified that error appears in the above-identified patent and that said Letters Patent is hereby corrected as shown below:

On the Title Page

Item (63) under Related U.S. Application Data should read: Continuation of application No. 15/292,407, filed on October 13, 2016, now Pat. No. 10,941,310 also claims benefit of Provisional Application No. 62/313,473 filed on March 25, 2016.

Signed and Sealed this
Nineteenth Day of March, 2024

Katherine Kelly Vidal
*Director of the United States Patent and Trademark Office*